US005587987A

United States Patent [19]
Okabe

[11] Patent Number: 5,587,987
[45] Date of Patent: Dec. 24, 1996

[54] INFORMATION RECORDING METHOD HAVING A LIQUID CRYSTAL SUBSTRATE

[75] Inventor: Masato Okabe, Tokyo, Japan

[73] Assignee: Dai Nippon Printing Co., Ltd., Tokyo, Japan

[21] Appl. No.: 532,153

[22] Filed: Sep. 22, 1995

[30] Foreign Application Priority Data

Sep. 22, 1994 [JP] Japan .................................. 6-227944

[51] Int. Cl.$^6$ ................................................. G11B 7/00
[52] U.S. Cl. ..................... 369/126; 369/103; 369/275.1; 250/331
[58] Field of Search ..................... 369/120, 126, 369/111, 275.1, 103; 359/72, 41; 250/331

[56] References Cited

U.S. PATENT DOCUMENTS

| | | | |
|---|---|---|---|
| 4,147,932 | 4/1979 | Lewis | 250/331 |
| 4,679,910 | 7/1987 | Efron et al. | 250/331 |

*Primary Examiner*—Nabil Hindi
*Attorney, Agent, or Firm*—Sughrue, Mion, Zinn, Macpeak & Seas

[57] ABSTRACT

Changes-with-time in the voltages of exposed and unexposed portions of a liquid crystal recording layer with respect to a photoconductive layer having a varying dark current value are found by varying an applied voltage, and the applied voltage and the value of a dark current through the photoconductive layer are determined such that when the voltage of the unexposed portion of the liquid crystal recording layer reaches the threshold voltage of the liquid crystal recording layer, the difference in voltage between the exposed and unexposed portions of the liquid crystal recording layer reaches a maximum, so that information is recorded with the photoconductive layer and at the applied voltage, where a potential difference is obtained, which is at least one half of the difference (maximum contrast) in the voltages applied on the liquid crystals at the exposed and unexposed portions of the liquid crystal recording layer.

7 Claims, 8 Drawing Sheets

INFORMATION RECORDING METHOD HAVING A LIQUID CRYSTAL SUBSTRATE

BACKGROUND OF THE INVENTION

The present invention relates to a method for recording information on an integrated type of information recording system comprising a photoelectric sensor and a liquid crystal recording medium stacked on each other.

There has so far been known an integrated type of information recording system which comprises a liquid crystal recording medium including on an electrode a liquid crystal-polymer composite layer with polymer balls filled in a liquid crystal phase and a photoelectric sensor including a photoconductive layer on an electrode layer, both stacked on each other, and which is exposed to light at an applied voltage to record an image thereon.

Such an integrated type of information recording system is schematically shown in FIG. 1. More specifically, this system is broken down into two types, the first type wherein a liquid crystal medium 20 is directly stacked on a photoelectric sensor 10 as shown in FIG. 1(a), and the second type wherein an interlayer 24 made up of a transparent dielectric material (transmission type) or a dielectric mirror (reflection type) is interposed between them, as shown in FIG. 1(b). In the photoelectric sensor 10 a transparent electrode 12 and a photoconductive layer 13 are successively stacked on a transparent substrate 11, and in the liquid crystal recording medium 20 a liquid crystal-polymer composite layer 23 is stacked on a transparent electrode 22. When the photoconductive layer 13 used has a single-layer structure, amorphous selenium, amorphous silicon and so on may be used in the form of an inorganic photoconductive layer, and polyvinyl carbazole may be used with trinitrofluorenone added thereto in the form of an organic photoconductive layer. Alternatively, use may also be made of a composite photoconductive layer comprising a carrier generation layer having an azo dye dispersed in resin such as polyvinyl butyral and a carrier transport layer having a hydrazone derivative mixed with resin such as polycarbonate, both layers stacked on each other.

When such an integrated type of information recording system is irradiated with recording light in the form of visible light with voltage applied from a power source 30 across the electrodes 12 and 22 thereof, as shown in FIG. 2, there is a change in the conductivity of the photoconductive layer 13 depending on the intensity of visible light. This change in turn causes an electric field applied on the liquid crystal layer 23 to change, resulting in a change in the orientation of liquid crystals. Even after removal of the electric field by putting off the application of voltage, this state is so maintained that image information can be recorded.

To read out the thus recorded image information, the liquid crystal recording medium 20 is irradiated with reading light which emanates from a light source 60 and is selected in terms of wavelength through a filter 70, as shown in FIG. 3(a) (transmission type) and FIG. 3(b) (reflection type). The incident light is modulated by the orientation of liquid crystals in the liquid crystal recording medium, while the transmitted (or reflected) light is converted by an photoelectric converter 80 into an electrical signal, which may be outputted through a printer or CRT, if required. The light source 60 used may be a white light source such as a xenon or halogen lamp, or laser light.

However, a problem with recording an image with an integrated type of liquid crystal recording system is that, although depending on the characteristics of the photoelectric sensor, the quantity of exposure light (light intensity× exposure time) required for image recording often becomes too large, or no image can be recorded at all. A liquid crystal recording layer has a certain threshold voltage. As can be understood from FIG. 4 illustrating the range of modulation of liquid crystals, when the voltage applied on the liquid crystal layer is within the range of 200 V to 250 V for example, recording can be made depending on the quantity of exposure light. At lower than 200 V, however, no image can be recorded because the liquid crystals are hardly oriented. At higher than 250 V, no image can again be recorded because of saturated orientation.

SUMMARY OF THE INVENTION

It is thus one object of the present invention to provide an information recording method using an integrated type of information recording system including a dielectric interlayer.

Another object of the present invention is to enable the optimum photoelectric sensor to be specified, even when there are changes in the values of the capacity and resistance of a dielectric interlayer, and the values of the capacity, resistance and threshold voltage of a liquid crystal recording layer.

Still another object of the present invention is to enable the optimum photoelectric sensor to be so specified that information can be recorded at the optimum applied voltage for the optimum voltage applying time.

More specifically, the present invention provides an information recording method using an integrated type of information recording system having a photoconductive layer, a dielectric interlayer, a liquid crystal recording layer and an electrode layer stacked on a transparent electrode in the described order, wherein the photoconductive layer is exposed to information light with voltage applied across both electrodes of the system so that the liquid crystals are oriented to record image information depending on the quantity of the exposure light, characterized in that:

from the following equations:

$$V_S(0) = \frac{C_M C_L}{C_S C_M + C_M C_L + C_L C_S} V_{AP}$$

$$V_M(0) = \frac{C_L C_S}{C_S C_M + C_M C_L + C_L C_S} V_{AP}$$

$$V_L(0) = \frac{C_S C_M}{C_S C_M + C_M C_L + C_L C_S} V_{AP}$$

$$I_S + C_S(dV_S/dt) = I_M + C_M(dV_M/dt)$$
$$= I_L + C_L(dV_L/dt)$$

$$V_S + V_M + V_L = V_{AP}$$

$$dV_M/dt = \frac{C_L I_S - (C_S + C_L)I_M + C_S I_L}{C_S C_M + C_M C_L + C_L C_S}$$

$$dV_L/dt = \frac{C_M I_S + C_S I_M - (C_S + C_M)I_L}{C_S C_M + C_M C_L + C_L C_S}$$

$$V_M(t + \Delta t) = V_M(t) + (dV_M/dt)\Delta t$$
$$V_L(t + \Delta t) = V_L(t) + (dV_L/dt)\Delta t$$

where $V_{AP}$ is the voltage applied across both electrodes; $C_S$, $C_L$ and $C_M$ are the capacities of the photo conductive layer, the liquid crystal recording layer and the interlayer, respectively; $V_S$, $V_L$ and $V_M$ are the voltages applied on the respective layers; $I_S$, $I_L$ and $I_M$ are the currents flowing through the respective layers; and $V_S(0)$, $V_M(0)$ and $V_L(0)$ are the voltages applied on the respective layers just after the application of voltages, changes-with-time in the voltages of exposed and unexposed portions of the liquid crystal recording layer with respect to the photoconductive layer having a varying dark current value are found by varying the applied voltage, and the applied voltage and the value of the dark current through the photoconductive layer are determined such that when the voltage of the unexposed portion of the liquid crystal recording layer reaches the threshold voltage of the liquid crystal recording layer, the difference in voltage between the exposed and unexposed portions of the liquid crystal recording layer reaches a maximum, so that information is recorded with the photoconductive layer and at the applied voltage, where a potential difference is obtained, which is at least one half of the difference (maximum contrast) in the voltages applied on the liquid crystals at the exposed and unexposed portions of the liquid crystal recording layer.

DESCRIPTION OF THE PREFERRED EMBODIMENT

An account will now be given of how to calculate changes in the voltages applied on an integrated type of information recording system comprising three layers, a photoelectric sensor, a liquid crystal recording layer and an interlayer, i.e., in the voltages applied on the liquid crystal recording layer and interlayer thereof.

Figure 1A:
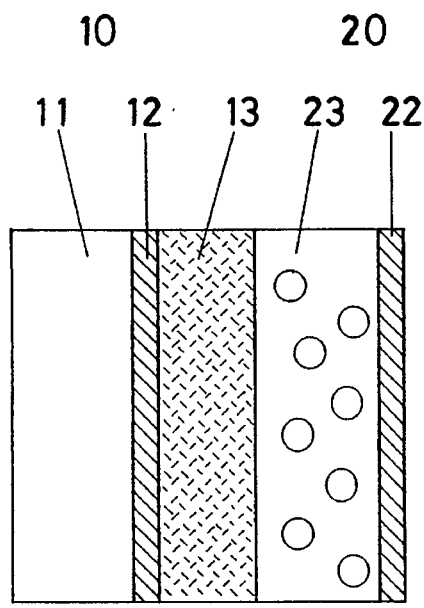
FIGS. 1(a) and 1(b) are a schematic view showing an integrated type of liquid crystal recording system.
Figure 1B:
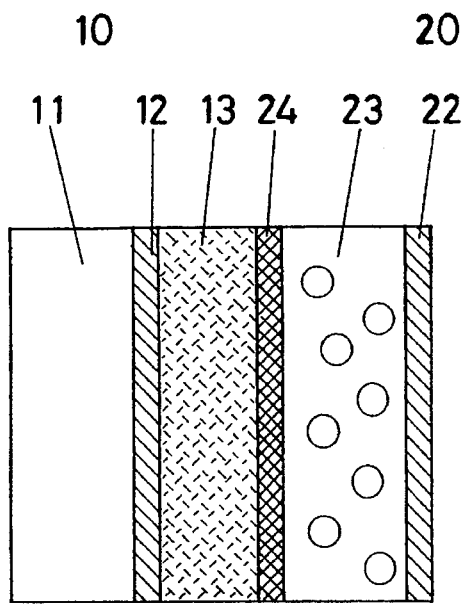
Figure 2:
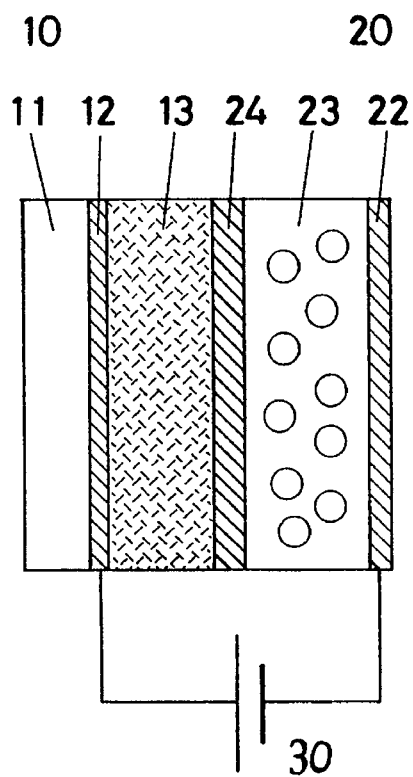
FIG. 2 is a schematic view illustrating how to recording information on an integrated type of liquid crystal recording system.
Figure 3:
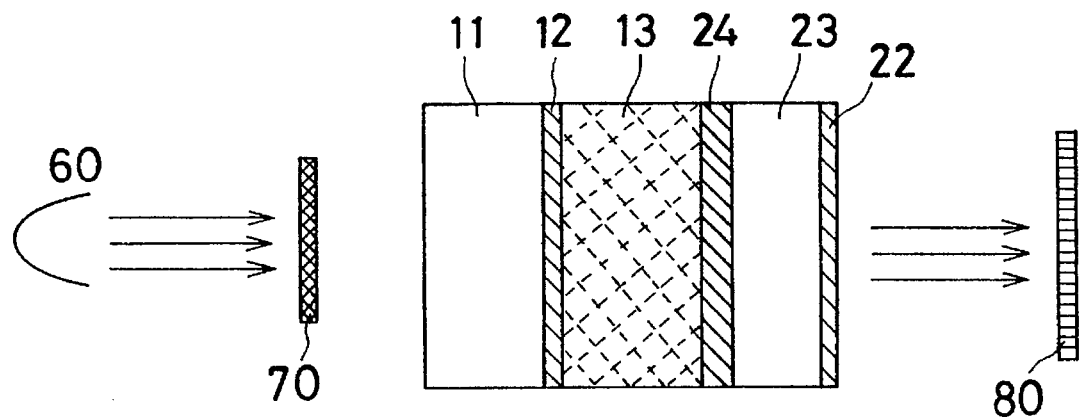
FIGS. 3(a) and 3(b) are a schematic view illustrating how to read the recorded information.
Figure 3:
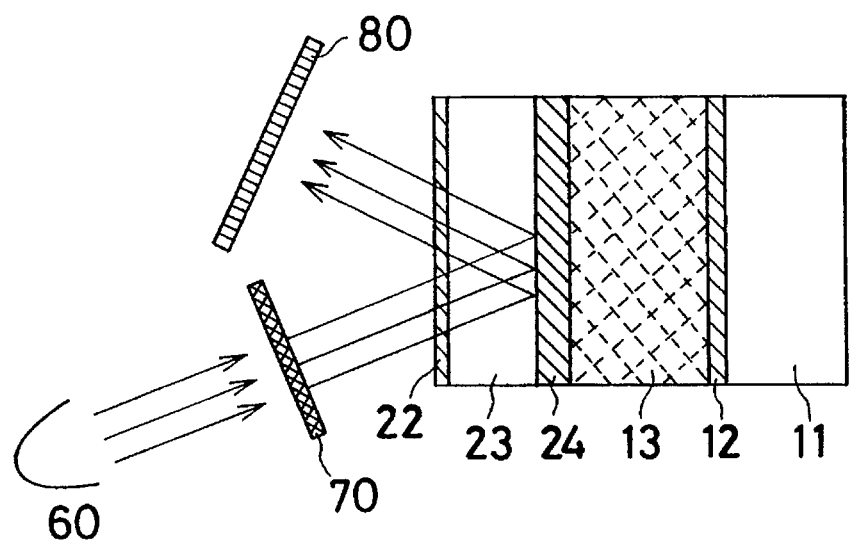
Figure 4:
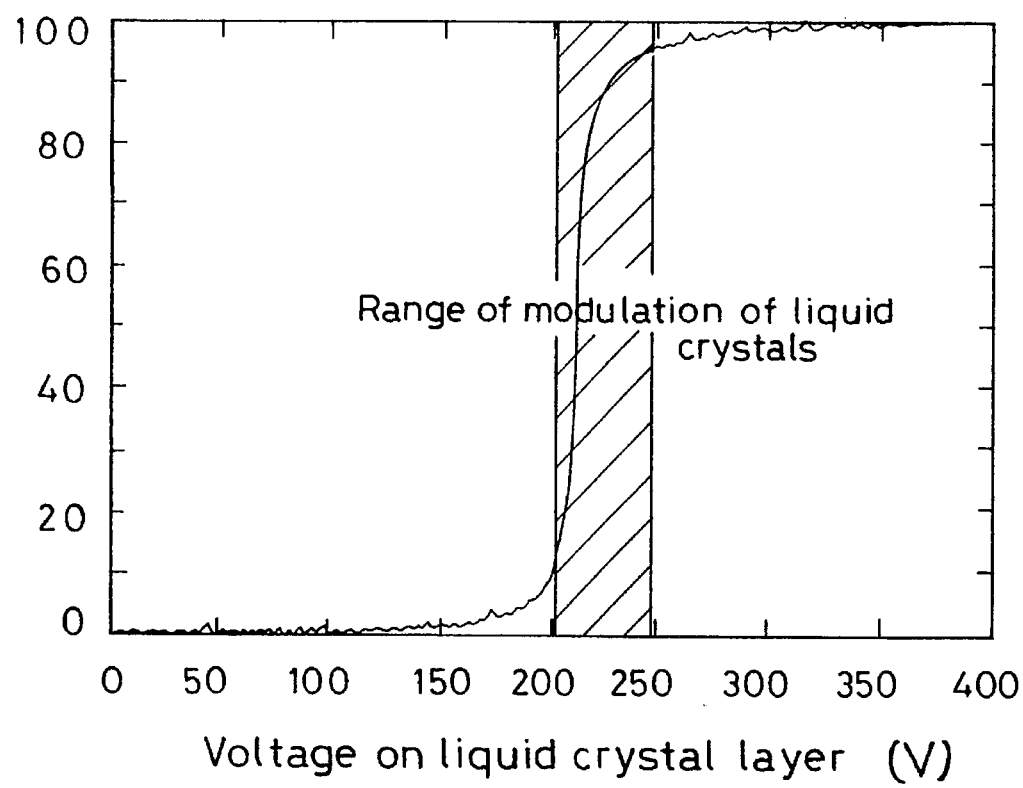
FIG. 4 is a schematic view illustrating the range of modulation of liquid crystals.
Figure 5:
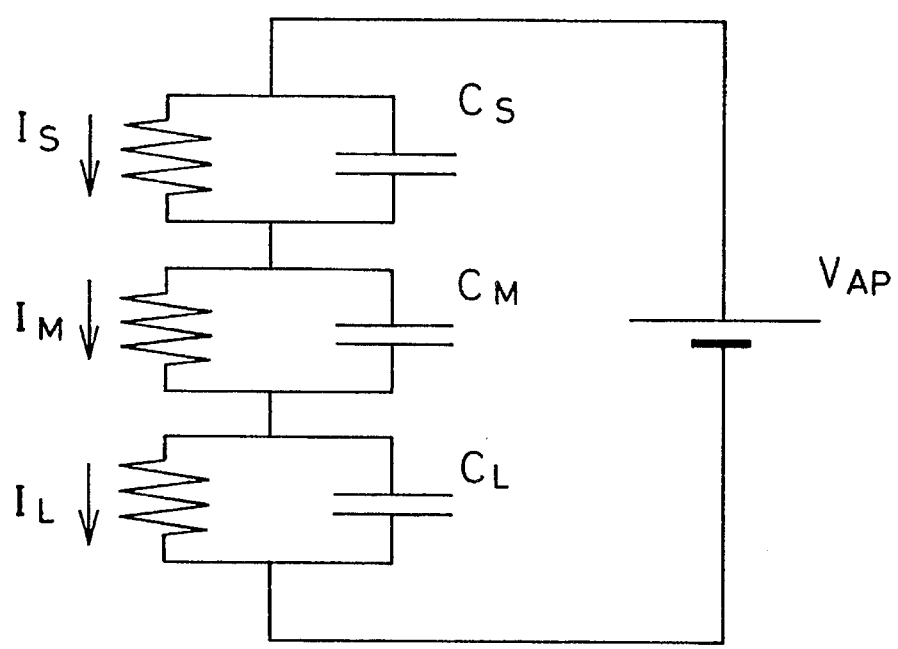
FIG. 5 is a schematic view illustrating an equivalent circuit of an integrated type of liquid crystal recording system.

The integrated type of information recording system is represented by an equivalent circuit shown in FIG. 5. Here let $C_S$, $C_L$ and $C_M$ denote the capacities of the photoelectric sensor, liquid crystal recording layer and interlayer, respectively, and $V_{AP}$ represent the power source voltage. Then, the voltages $V_S(0)$, $V_L(0)$ and $V_M(0)$ distributed to the photoelectric sensor, liquid crystal recording layer and interlayer just after the application of voltage are respectively given by:

$$V_S(0) = \frac{C_M C_L}{C_S C_M + C_M C_L + C_L C_S} V_{AP} \quad (1\text{-}1)$$

$$V_M(0) = \frac{C_L C_S}{C_S C_M + C_M C_L + C_L C_S} V_{AP} \quad (1\text{-}2)$$

$$V_L(0) = \frac{C_S C_M}{C_S C_M + C_M C_L + C_L C_S} V_{AP} \quad (1\text{-}3)$$

Thereafter, currents flow through the resistance components of the layers, so that there are changes in the voltages of the layers. At this time, the following differential equation holds:

$$\begin{aligned} I_S + C_S(dV_S/dt) &= I_M + C_M(dV_M/dt) \\ &= I_L + C_L(dV_L/dt) \end{aligned} \quad (1\text{-}4)$$

Here, $$V_S + V_M + V_L = V_{AP} \quad (1\text{-}5)$$

$$dV_S/dt + dV_M/dt + dV_L/dt = 0 \quad (1\text{-}6)$$

$I_S$, $I_M$ and $I_L$ are the values of the currents through the photoelectric sensor, interlayer and liquid crystal recording layer, respectively. As already proposed (JP-A 6(1994)-88200), the value of the current through a photoelectric sensor differs at bright and dark portions and depends on voltage and time. This will now be briefly explained below.

Figure 6:
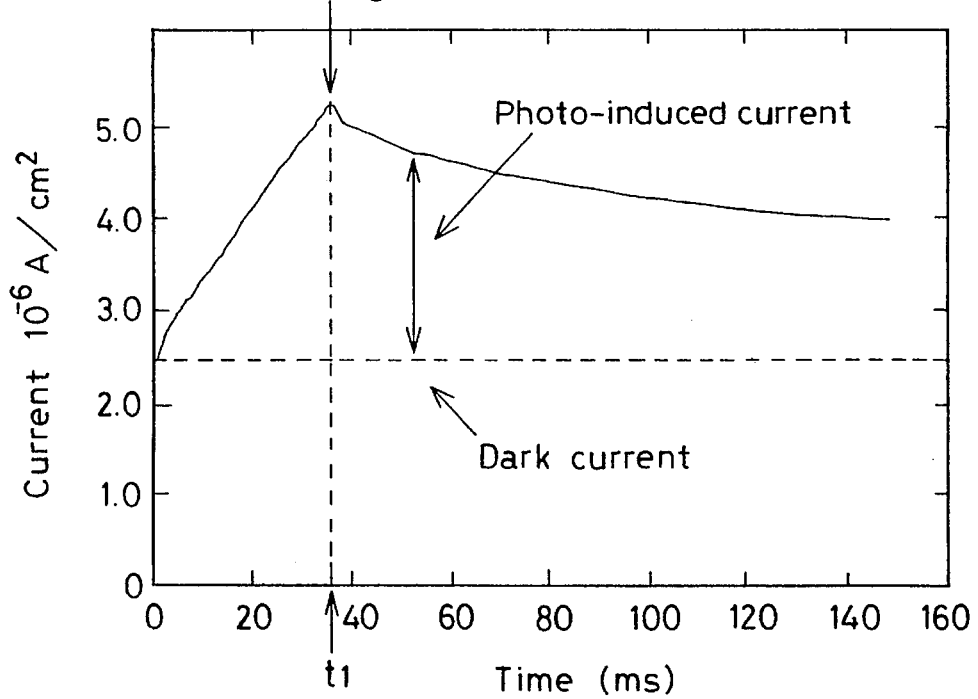
FIG. 6 is a graphical view illustrating the results, as measured, of the current through a photoelectric sensor.

Shown in FIG. 6 is a photo-induced current as measured when the photoelectric sensor of 10 μm in thickness is exposed to light at an intensity of 20 Lux for 33 msec and at an applied voltage of 300 V, with the time after the start of irradiation with light as abscissa. The dark current $I_d$ of the photoelectric sensor is defined as a current value at t=0, and the photo-induced current as a difference ΔI between the measured current value and the dark current.

As shown by a broken line in FIG. 6, the dark current $I_d$ is kept constant while voltage is applied to the photoelectric sensor, and the photo-induced current continues to flow even after the irradiation with light is put off. Now consider the case where a constant voltage V is applied to the photoelectric sensor. Then, the current flowing through the photoelectric sensor can be divided to a base current portion that flows regardless of irradiation with light and an incremental portion caused by irradiation with light. The base current is measured as a dark current in the absence of light, and when a constant voltage is applied to the photoelectric sensor, a current as represented by Eq. (2-1) flows through it.

$$Id = \alpha V_p^2 \quad (2\text{-}1)$$

where $I_d$ is the base (dark) current, α is a constant, and $V_p$ is the voltage of the photoelectric sensor.

When the photoelectric sensor is irradiated with light having constant intensity for a constant time, its current value varies with time, as shown in FIG. 6. The current value measured upon the start of irradiation with light is the base current given by Eq. (2-1). The photo-induced current portion is divided into a component upon irradiation with light and a component after the completion of irradiation with light.

The change in the photo-induced current cannot precisely be expressed by a simple equation. In a region having a field intensity (of 5 to 49 V/μm), a low exposure light intensity (of up to 50 Lux) and a short exposure time (of up to 100 msec), however, that change can be linearly approximated, as represented by Eq. (2-2).

$$\Delta I(t) \approx k V_p T (0 < t \leq t_1) \tag{2-2}$$

After the conclusion of irradiation with light, the photo-induced current attenuates at a time constant of 200 to 500 msec, as approximated by Eq. (2-3).

$$\Delta I(t) \approx k V_p t_1 \exp\{(t_1 - t)/\tau\}(t_1 < t) \tag{2-3}$$

where $\Delta I(t)$ = the photo-induced current, k = a constant (proportional to light intensity), $t_1$ = the time at which the irradiation with light is put off, and τ = a time constant (200 to 500 msec).

In a photoelectric sensor whose dark current value is in proportion to the applied voltage, the dark current value $I_d$ corresponding to the base current is given by $$I_d = \alpha' V_p \tag{2-4}$$

Accordingly, the current value $I_p$ of the photoelectric sensor at the bright portion is represented by the following equations with respect to during and after irradiation with light, respectively.

$$I_p(V_p, t) \approx \alpha V_p^2 + k V_p t_1 (0 < t \leq t_1) \tag{2-5}$$

$$I_p(V_p, t) \approx \alpha V_p^2 + k V_p t_1 \exp\{(t_1 - t)/\tau\}(t_1 < t) \tag{2-6}$$

In a photoelectric sensor whose dark current value is proportional to voltage, the base current portion is proportional to voltage and the photo-induced current is proportional to the one-second power of voltage, as given by $$I_p(V_p, t) = \alpha' V_p(I_p, t) + k' V_p^{1/2} t (0 < t \leq t1) \tag{2-7}$$

$$I_p(V_p, t) = \alpha' V_p(I_p, t) + k' V_p^{1/2} t_1 \exp\{(t_1 - t)/\tau\}(t_1 < t) \tag{2-8}$$

On the other hand, the currents of the liquid crystal recording layer and interlayer are proportional to voltage, as given by $$I_M = V_M / R_M \tag{3-1}$$

$$I_L = V_L / R_L \tag{3-2}$$

Here, $R_M$ and $R_L$ are the resistance components of the interlayer and liquid crystal recording layer. From Eqs. (1-4) and (1-6), $$dV_M/dt = \frac{C_L I_S - (C_S + C_L) I_M + C_S I_L}{C_S C_M + C_M C_L + C_L C_S} \tag{3-3}$$

$$dV_L/dt = \frac{C_M I_S + C_S I_M - (C_S + C_M) I_L}{C_S C_M + C_M C_L + C_L C_S} \tag{3-4}$$

By substituting Eqs. (3-1) to (3-4) for the following equations, it is possible to find the voltages of the interlayer and liquid crystal recording layer.

$$V_M(t + \Delta t) = V_M(t) + (dV_M/dt)\Delta t \tag{3-5}$$

$$V_L(t + \Delta t) = V_L(t) + (dV_L/dt)\Delta t \tag{3-6}$$

Figure 7:
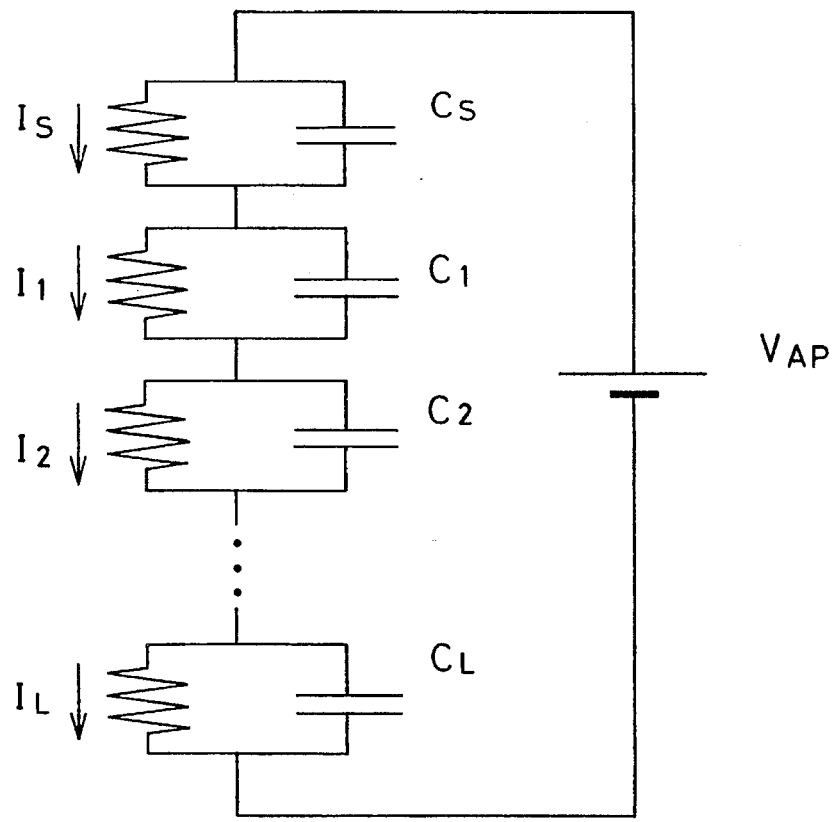
FIG. 7 is a schematic view illustrating an equivalent circuit of an integrated type of liquid crystal recording system including a plurality of interlayers.

When the interlayer is made up of two or more stacked layers different from each other in terms of resistivity and dielectric constant, the equivalent circuit is represented in FIG. 7. In this case, the voltage of each layer must be calculated depending on the structure of that layer. In what follows, an account will be given of how to calculate the voltage of an interlayer, when it is made up of two or more layers stacked one upon another.

When the interlayer is made up of n layers, the capacity $C_t$ of an integrated type of information recording system is given by $$C_t = 1/\{(1/C_S) + (1/C_L) + (1/C_1) + (1/C_2) \ldots \} \tag{4-1}$$

provided that the capacities and resistance of the layers are represented by $C_n$ (n=1, 2, 3, . . . . ).

At an initial stage of application of voltage, the voltages distributed to the photoelectric sensor, liquid crystal recording layer and interlayer are given by $$\begin{aligned} V_S(0) &= C_t V_{AP}/C_S \\ V_L(0) &= C_t V_{AP}/C_L \\ V_1(0) &= C_t V_{AP}/C_1 \\ V_2(0) &= C_t V_{AP}/C_2 \end{aligned} \tag{4-2}$$

.
.
.

As in the case where the interlayer is made up of a single layer, voltage changes occur after the application of voltage because of currents flowing through the resistance components of the layers. The differential equation in this transient state is given by $$\begin{aligned} I_S + C_S(dV_S/dt) &= I_L + C_L(dV_L/dt) \\ &= I_1 + C_1(dV_1/dt) \\ &= I_2 + C_2(dV_2/dt) \end{aligned} \tag{4-3}$$

.
.
.

Here, $$V_S + V_L + V_1 + V_2 \ldots = V_{AP} \tag{4-4}$$

$$dV_S/dt + dV_L/dt + dV_1/dt + dV_2/dt = 0 \tag{4-5}$$

The voltages of the liquid crystal recording layer and interlayer can be calculated from the following equations:

$$\begin{aligned} V_L(t + \Delta t) &= V_L(t) + (dV_L/dt)\Delta t \\ V_1(t + \Delta t) &= V_1(t) + (dV_1/dt)\Delta t \\ V_2(t + \Delta t) &= V_2(t) + (dV_2/dt)\Delta t \end{aligned} \tag{4-6}$$

.
.
.

Figure 8:
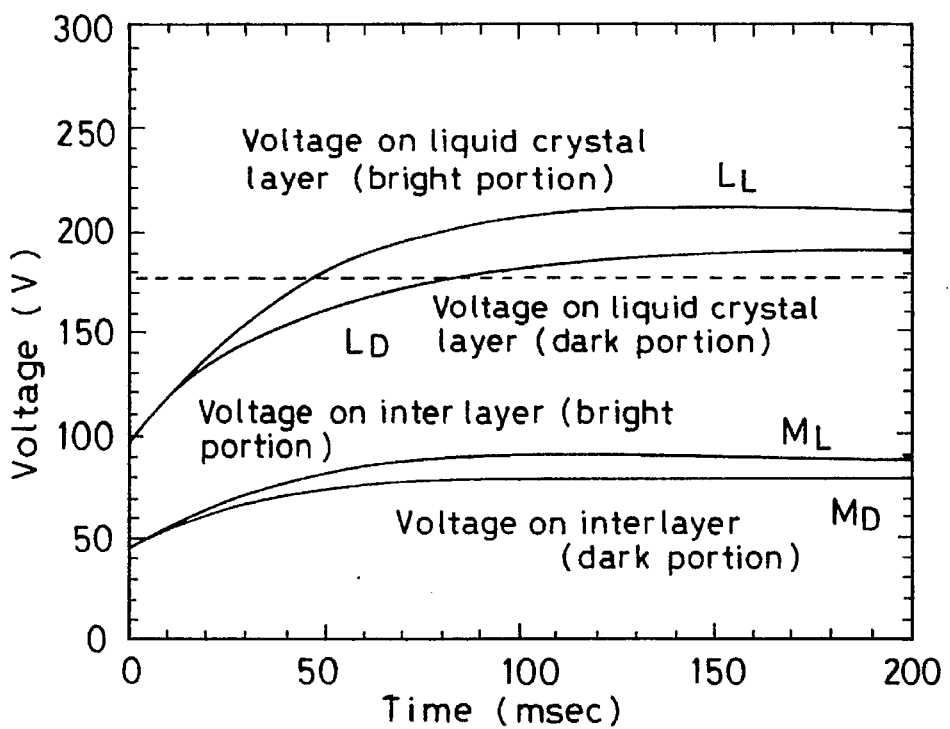
FIGS. 8(a) and 8(b) are a graphical view illustrating changes in the voltages applied on the liquid crystal recording layer and interlayer.
Figure 8:
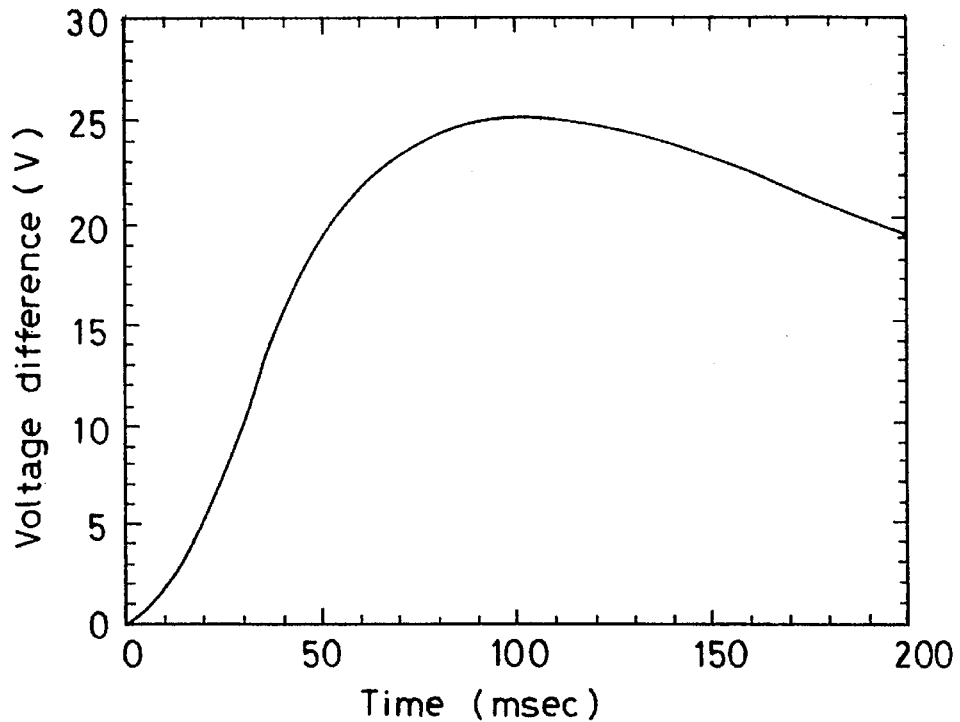

From the above-described equations, the voltages applied on the liquid crystal recording layer and interlayer of an integrated type of information recording system can be calculated. Shown in FIG. 8 are the voltages applied on the liquid crystal recording layer and interlayer, as calculated from Eqs. (3-5) and (3-6). Set out below are the physical characteristic values of the photoelectric sensor, liquid crystal recording layer and interlayer used for calculation.

Capacity of the photoelectric sensor: 310 pF/cm$^2$
Dark current value of the photoelectric sensor: $5.0 \times 10^{-7}$ A/cm$^2$ (at an applied voltage of 100 V)
Capacity of the liquid crystal recording layer: 950 pF/cm$^2$
Resistance of the liquid crystal recording layer: 160 MΩ/cm$^2$ Capacity of the interlayer: 2,000 pF/cm$^2$
Resistance of the interlayer: 64 MΩ/cm$^2$
Applied voltage: 430 V
Thickness of the photoelectric sensor: 10 μm
Thickness of the liquid crystal medium: 6 μm
Thickness of the interlayer: 1.5 μm In FIG. 8(a), curves $L_L$ and $L_D$ represent the voltages applied on the bright and dark portions of the liquid crystal recording layer, respectively, and curves $M_L$ and $M_D$ indicate the voltages applied on those of the interlayer. Immediately after the application of voltage, the voltages distributed to the liquid crystal recording layer and interlayer are about 95 V and about 45 V, respectively. Thereafter, the voltages applied on the liquid crystal recording layer and interlayer change because of currents flowing through the resistance components thereof. At the bright portion rather than at the dark portion, the voltage applied on the liquid crystal recording layer becomes excessive because the photoelectric sensor can have a higher conductivity.

FIG. 8(b) shows a voltage difference between the bright and dark portions of the liquid crystal recording layer. This voltage difference increases with time and, in the instant example, reaches a maximum at about 100 msec. According to the recording system of the present invention, it is preferable to record an image thereon when the voltage difference between the bright and dark portions reaches a maximum. It is then desired that the voltage to be applied be controlled such that the voltage of the liquid crystal recording layer at the dark portion reaches the threshold voltage. This is because when the voltage of the liquid crystal recording layer exceeds the threshold voltage, the orientation of liquid crystals occurs regardless of exposure, and at lower than the threshold voltage the liquid crystals do not work (orient); in either case, no image of good quality can be recorded.

Figure 9:
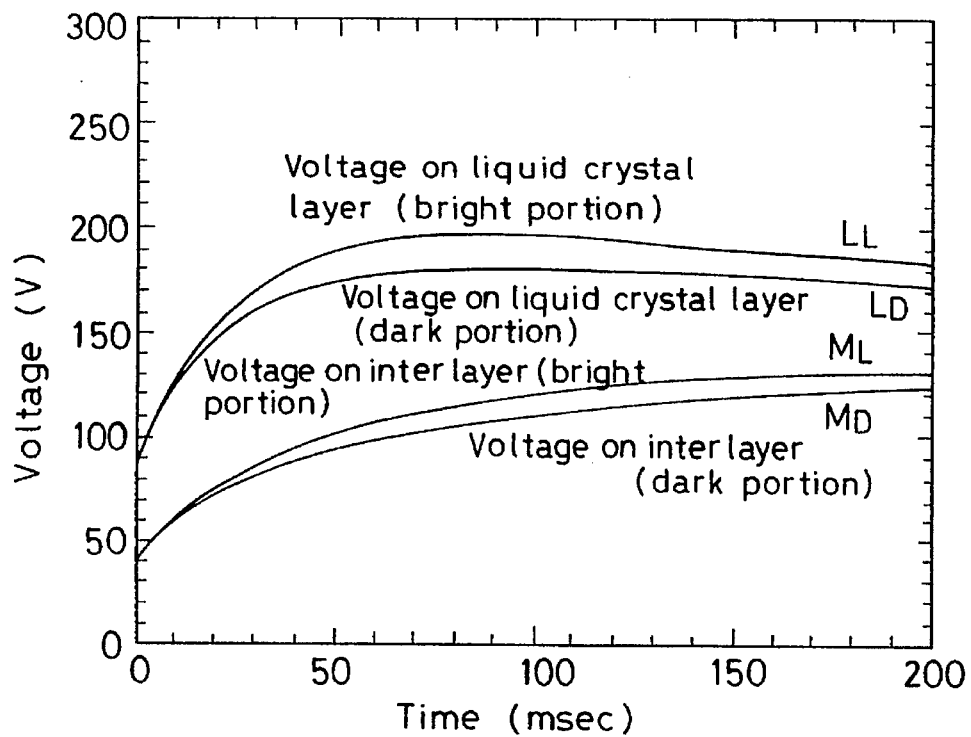
FIGS. 9(a) and 9(b) are a graphical view illustrating changes in the voltages applied on the liquid crystal recording layer and interlayer.
Figure 9:
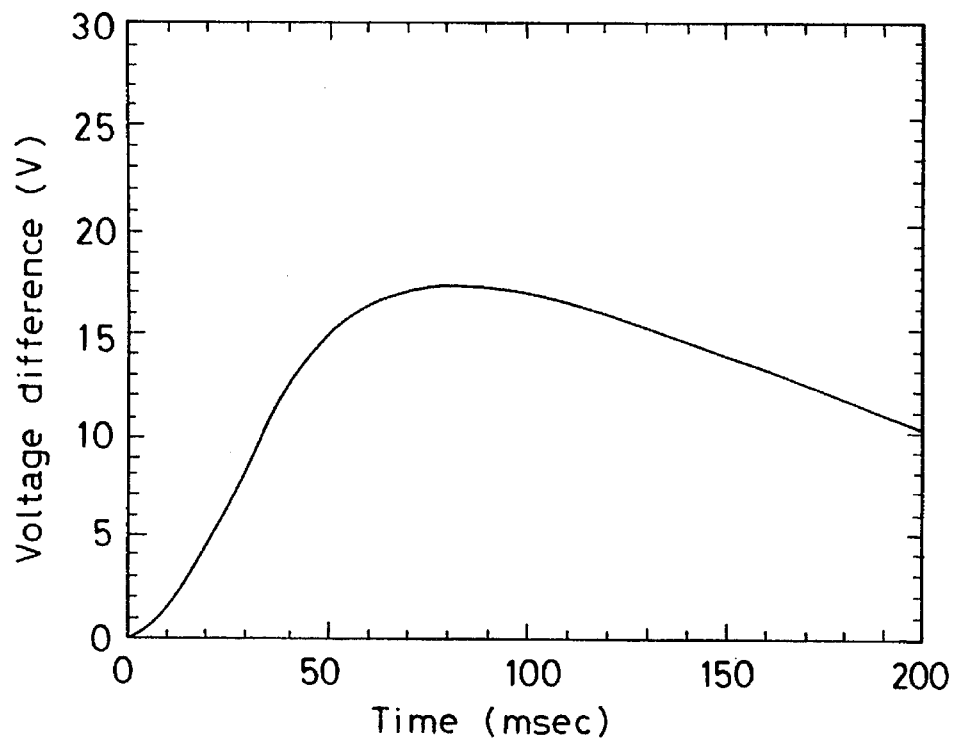

Shown in FIG. 9, on the other hand, are the results of calculation of the voltages applied on the liquid crystal recording layer and interlayer while the dark current value (conductivity) of the photoelectric sensor and the resistivity of the interlayer were varied (with increases in the dark current value and the resistivity of the interlayer). Set out below are the physical characteristic values used for calculation.

Capacity of the photoelectric sensor: 310 pF/cm$^2$
Dark current value of the photoelectric sensor: $1.0 \times 10^{-6}$ A/cm$^2$ (at an applied voltage of 100 V)
Capacity of the liquid crystal recording layer: 950 pF/cm$^2$
Resistance of the liquid crystal recording layer: 160 MΩ/cm$^2$
Capacity of the interlayer: 2,000 pF/cm$^2$
Resistance of the interlayer: 160 MΩ/cm$^2$
Applied voltage: 390 V
Thickness of the photoelectric sensor: 10 μm
Thickness of the liquid crystal medium: 6 μm
Thickness of the interlayer: 1.5 μm From FIG. 9(a), it can be seen that the voltage applied on the liquid crystal recording layer is about 90 V immediately after the application of voltage, then increases because of a current flowing through the resistance component of the photoelectric sensor, then reaches a maximum after about 100 msec, and finally decreases. This phenomena take place because the voltage across the interlayer increases due to the large resistance value thereof. From FIG. 9(b), on the other hand, it can be seen that the voltage difference between the bright and dark portions of the liquid crystal recording layer reaches a maximum at about 75 msec. This time is shorter as compared with FIG. 8(b) due to an increase in the dark current value of the photoelectric sensor.

In some cases, the voltage of the liquid crystal recording layer reaches a maximum at a certain time depending on the conductivity of the photoelectric sensor and the resistivity of the liquid crystal recording layer, and thereafter decreases. It is then required that when the voltage of the dark portion reaches a maximum before the voltage difference between the bright and dark portions reaches a maximum, an image be recorded before the voltage of the dark portion reaches a maximum. In other words, it is required that the applied voltage be such that the maximum voltage of the dark portion becomes slightly higher than the threshold voltage of liquid crystals, so that an image can be recorded at a potential difference (contrast potential) between the bright and dark portions. In the process during which the voltage of the liquid crystal recording layer decreases, no image can be recorded because no further orientation of liquid crystal takes place. This would be true of even when the potential difference between the bright and dark portions reaches a maximum in the process during which the voltage of the dark portion reaches a maximum and then decreases. In such a case, it is required that the recording of an image be finished when the voltage of the dark portion reaches a maximum.

In a simulation of calculation of the voltage applied on the liquid crystal recording layer using a photoelectric sensor having a varying dark current value (while the coefficient α in Eq. (2-1) was varied), the maximum values of the voltages of the bright and dark portions and the optimum value for the voltage applying time were calculated at the applied voltage preset such that the voltage of the liquid crystal recording layer at the dark portion reaches the threshold voltage at the time when the potential difference between the dark and light portions reaches a maximum. For instance, where the voltage of the liquid crystal recording layer at the dark portion has a maximum value (as shown in FIG. 9), $t_2$ at which the voltage of the liquid crystal recording layer at the dark portion reaches a maximum is often shorter than $t_1$ at which the potential difference between the bright and dark portions reaches a maximum. It is then time $t_2$ that is the optimum value for the voltage applying time.

For this reason, the simulation was done under the conditions that the potential difference between the bright and dark portions reaches a maximum and the voltage of the dark portion reaches a maximum. Set out below are the physical characteristic values used for the simulation.

Figure 10:
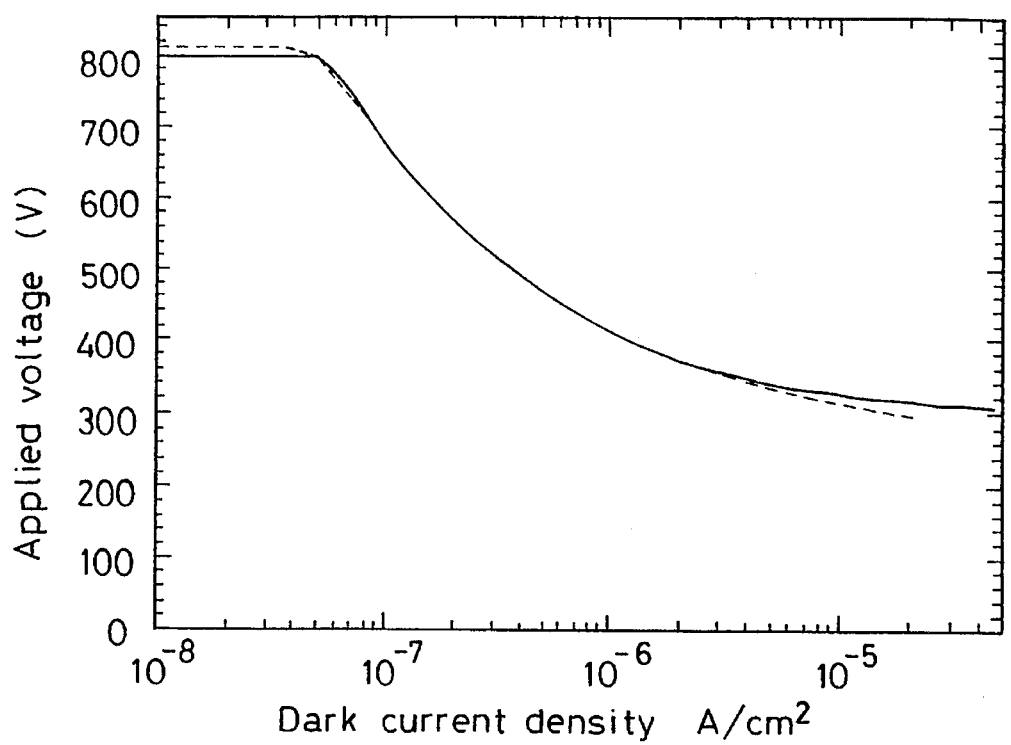
FIG. 10 is a graphical view illustrating the relation between the applied voltage providing the maximum potential difference between the exposed and unexposed portions and the dark current.

Capacity of the photoelectric sensor: 310 pF/cm$^2$
Capacity of the liquid crystal recording layer: 950 pF/cm$^2$
Resistance of the liquid crystal recording layer: 160 MΩ/cm$^2$
Capacity of the interlayer: 2,000 pF/cm$^2$
Resistance of the interlayer: 160 MΩ/cm$^2$
Thickness of the photoelectric sensor: 10 μm
Thickness of the liquid crystal medium: 6 μm
Thickness of the interlayer: 1.5 μm Shown in FIG. 10 is the relation between the applied voltage and the dark current density when the dark current value of the photoelectric sensor was varied. A solid line indicates the applied voltage at which the potential difference between the bright and dark portions reaches a maximum, and a broken line represents the applied voltage preset under the condition that the voltage of the dark portion reaches a maximum (the threshold voltage). It should here be noted that calculation was made assuming that the applied voltage is within the range of 200 V to 800 V, because at an applied voltage exceeding 800 V an initial voltage distributed to the liquid crystal recording layer is lower than the threshold voltage.

As can be seen from FIG. 10, a photoelectric sensor, if its dark current is lower than $5\times10^{-8}$ A/cm$^2$, cannot be applied to the present system, because the applied voltage exceeds 800 V.

Figure 11:
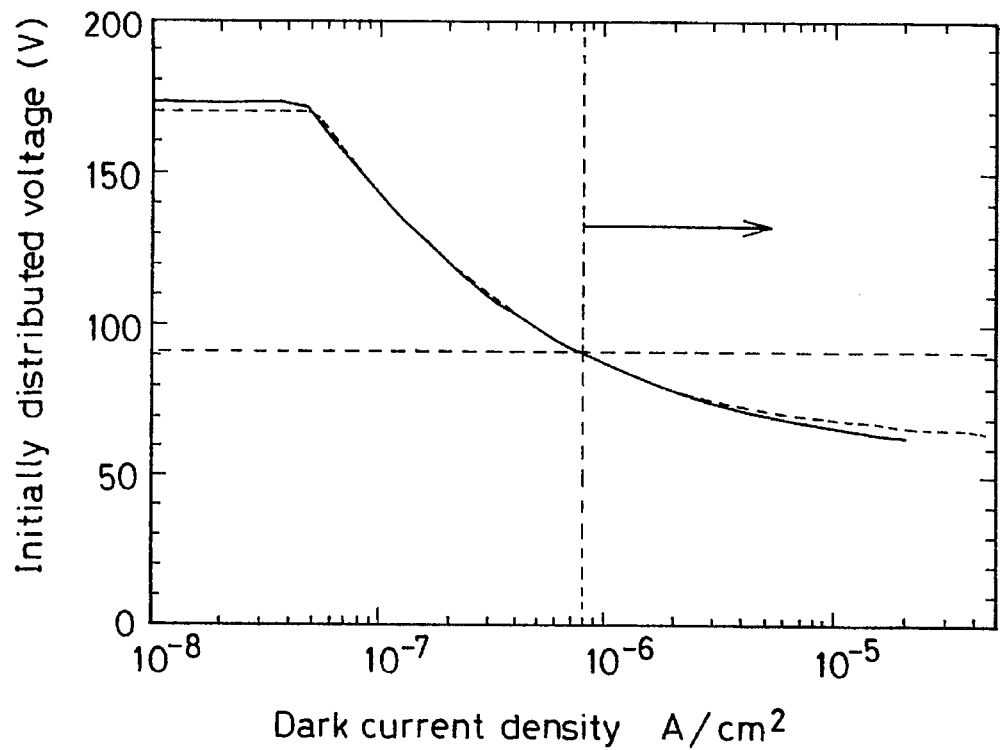
FIG. 11 is a graphical view illustrating the relation between an initial voltage distributed to the liquid crystal recording layer and the dark current.

Shown in FIG. 11 is the relation between the initial voltage distributed to the liquid crystal recording layer and the dark current. As can be seen from FIG. 11, it is required that the initial voltage be lower than the threshold voltage. If the threshold voltage is of the order of about 180 V, it is then somehow possible to use a photoelectric sensor of $1.0\times10^{-7}$ A/cm$^2$. Since the initial voltage is preferably at most one half of the threshold voltage, however, FIG. 11 teaches that it is preferable to use a photoelectric sensor having a dark current value of at least $8\times10^{-7}$ A/cm$^2$.

Figure 12:
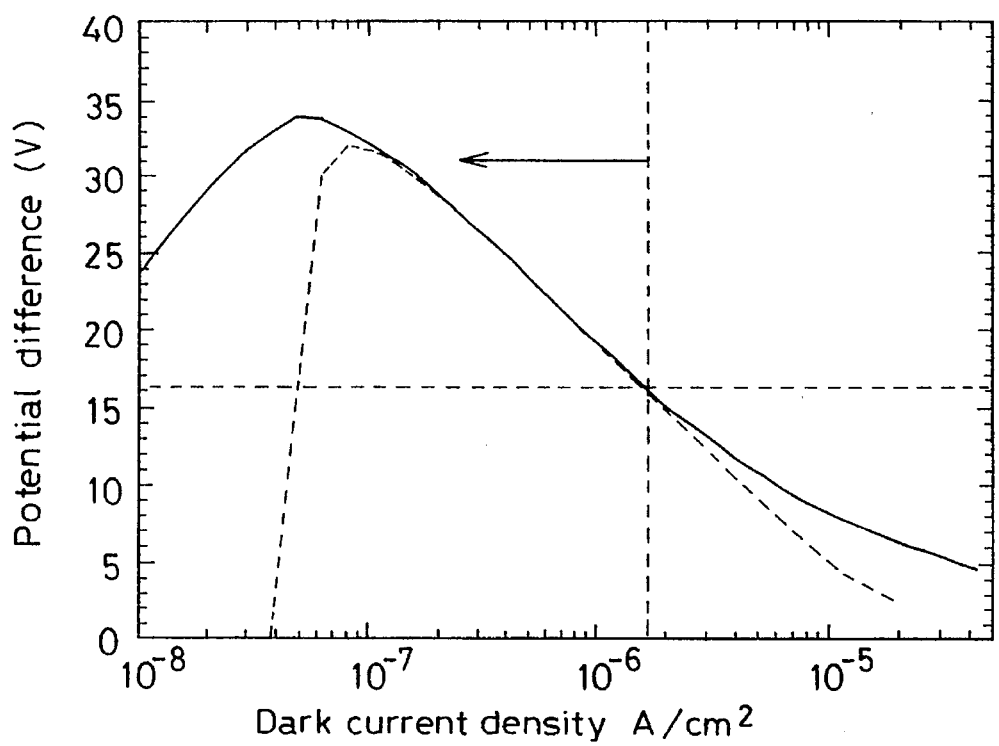
FIG. 12 is a graphical view illustrating the relation between the maximum potential difference between the exposed and unexposed portions and the dark current density.

The relation between the potential difference between the bright and dark portions and the dark current value of the photoelectric sensor is shown in FIG. 12, wherein a solid line indicates the potential difference found under the condition that the potential difference between the bright and dark portions reaches a maximum, and a broken line represents the potential difference found under the condition that the voltage of the dark portion reaches a maximum. Referring here to how to find the broken line, the applied voltage and the voltages distributed to the layers are determined, as shown in FIGS. 11 and 12. Then, the voltage applied on the liquid crystal recording layer is found from Eqs. (3-1) to (3-6). Thus, the broken line is found in the form of the potential difference between the bright and dark portions when the solid line in the form of the maximum value of the potential difference between the bright and dark portions represents that the voltage of the dark portion reaches a maximum (threshold voltage).

Figure 13:
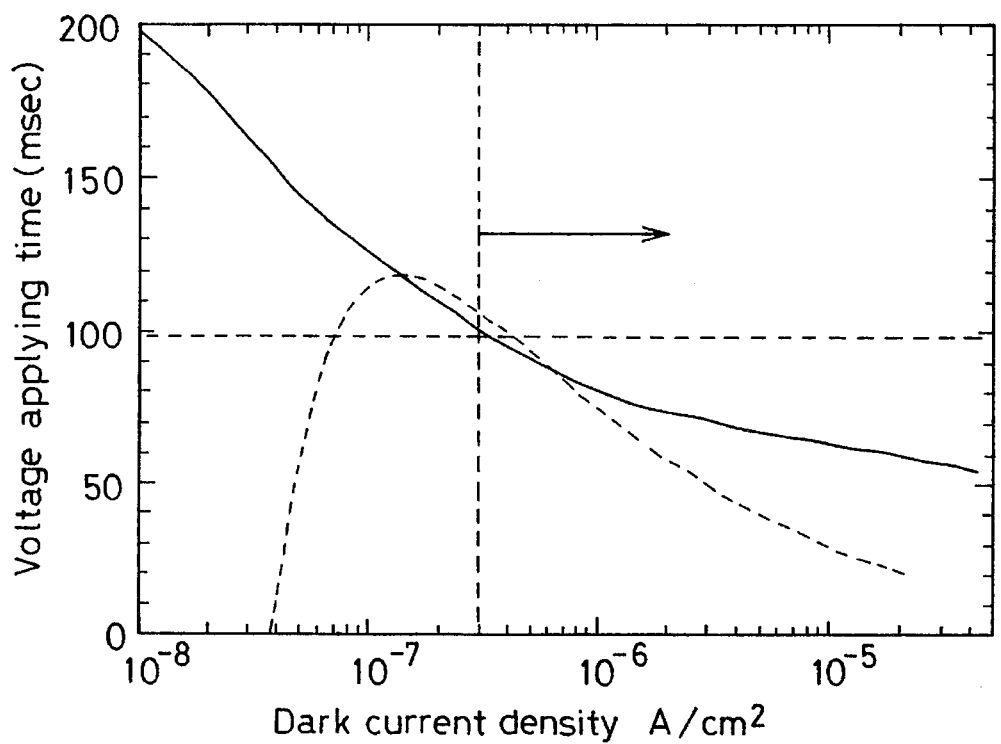
FIG. 13 is a graphical view illustrating the relation between the voltage applying time providing the maximum potential difference between the exposed and unexposed portions and the dark current density.

As shown by the solid line in FIG. 12, the maximum value of 34 V for the potential difference is obtained at a dark current value of $5\times10^{-8}$ A/cm$^2$. Under the condition that the voltage of the dark portion shown by the broken line reaches a maximum (threshold voltage), the potential difference between the bright and dark portions is 25 V. This indicates that when the potential difference between the bright and dark portions reaches a maximum, the voltage of the liquid crystal recording layer at the dark portion is decreasing after already reached a maximum. This voltage decreasing process can also be seen from FIG. 13 showing the relation between the dark current value and the voltage applying time. In FIG. 13, too, the conditions for finding the solid and broken lines are the same as explained in connection with FIG. 12. When the dark current value is $5\times10^{-8}$ A/cm$^2$, the broken line lies beneath the solid line, indicating that the time the potential of the dark portion reaches a maximum is shorter than the time the potential difference between the bright and dark portions reaches a maximum. Referring again to FIG. 13, it should be noted that for a dark current value represented by a broken line portion lying above the solid line, the potential of the dark portion does not reach a maximum even when the potential difference between the bright and dark portions has already reached a maximum.

In such a voltage decreasing process, no image can be recorded, and so the maximum value for the potential difference is 32 V under the condition that the dark current value of the photoelectric sensor is $8.0\times10^{-8}$ A/cm$^2$, as shown by the broken line in FIG. 12.

This value is the maximum value for the potential difference, with the potential difference decreasing regardless of a conductivity increase or decrease. To record an image of good quality, as large a potential difference as possible is needed between the bright and dark portions. In other words, it is desired that the potential difference be at least one half of this maximum value of 32 V and that the dark current value of the photoelectric sensor used be within the range of $4.0\times10^{-8}$ A/cm$^2$ to $2.0\times10^{-6}$ A/cm$^2$.

As can be seen from FIG. 13 showing the relation between the dark current value and the voltage applying time, the voltage applying time may be up to 200 msec, but should preferably be up to 100 msec. As can thus be understood from FIG. 13, it is preferable to use a photoelectric sensor having a dark current value of at least $3.0\times10^{-7}$ A/cm$^2$.

The foregoing is one exemplary simulation. By simulation, the optimum photoelectric sensor can be achieved even when there are variations in the thickness of a photoelectric sensor and liquid crystal recording medium, the thickness, capacity and resistance of an interlayer, and the capacity, resistance and threshold electrode of a liquid crystal recording layer.

EXAMPLE 1

Three (3) parts of a fluorenone azo dye acting as a carrier generation substance and having the following structural formula (1) and 1 part of a polyester resin were mixed with 196 parts of a mixed solvent of dioxane and cyclohexanone at 1:1, and the mixture was then sufficiently kneaded together in a mixer to prepare a coating solution.

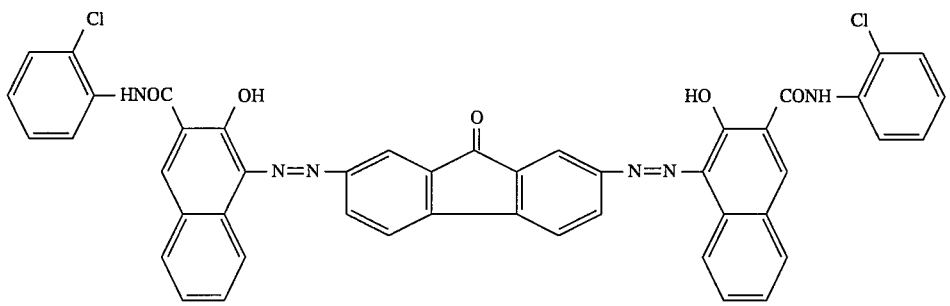

Formula (1)

This solution was coated on the side of a glass substrate on which an ITO transparent electrode (of 500 Å in thickness and 80 Ω/□ in resistance) was formed, and dried at 100° C. for 1 hour to form a carrier generation layer of 0.3 μm in thickness.

Then, 3 parts of p-dimethylstilbene acting as a carrier transport substance and having the following structural formula (2) and 1 part of a polystyrene resin were mixed with and dissolved in 180 parts of a mixed solvent of dichloromethane and 1,1,2-trichloroethane at 68:102 to prepare a coating solution.

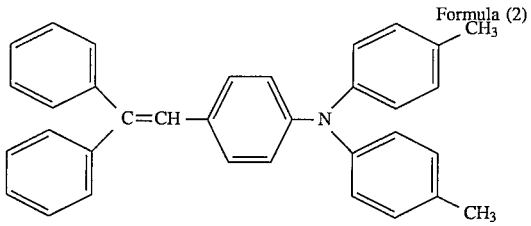

Formula (2)

This solution was coated on the above-described carrier generation layer, and dried at 80° C. for 2 hours to form a carrier transport layer, thereby preparing a photoelectric sensor of 10 μm in thickness.

EXAMPLE 2

Three (3) parts of the fluorenone azo dye acting as a carrier generation substance and having the above formula (1) and 1 part of a polyvinyl formal resin were mixed with 180 parts of a mixed solvent of dioxane and cyclohexanone at 1:1, and the mixture was then sufficiently kneaded together in a mixer to prepare a coating solution.

This solution was coated on the side of a glass substrate on which an ITC transparent electrode (of 500 Å in thickness and 80 Ω/☐ in resistance) was formed, and dried at 100° C. for 1 hour to form a carrier generation layer of 0.3 μm in thickness.

Then, 3 parts of p-dimethylstilbene acting as a carrier transport substance and having the above formula (2) and 1 part of a polystyrene resin were mixed with and dissolved in 180 parts of a mixed solvent of dichloromethane and 1,1,2-trichloroethane at 68:102 to prepare a coating solution. This solution was coated on the above-described carrier generation layer, and dried at 80° C. for 2 hours to form a carrier transport layer, thereby preparing a photoelectric sensor of 10 μm in thickness.

EXAMPLE 3

Three (3) parts of the azo dye acting as a carrier generation substance and having the above formula (1) and 1 part of a polyvinyl formal resin were mixed with 202 parts of a mixed solvent of dioxane and cyclohexanone at 1:1, and the mixture was then sufficiently kneaded together in a mixer to prepare a coating solution. This solution was coated on the side of a glass substrate on which an ITO transparent electrode (of 500 Å in thickness and 80 Ω/☐ in resistance) was formed, and dried at 100° C. for 1 hour to form a carrier generation layer of 0.3 μm in thickness.

Then, 3 parts of 4-methyltriphenylamine acting as a carrier transport substance and 1 part of a polycarbonate resin were mixed with and dissolved in 180 parts of a mixed solvent of dichloromethane and 1,1,2-trichloroethane at 68:102 to prepare a coating solution. This solution was coated on the above-described carrier generation layer, and dried at 80° C. for 2 hours to form a carrier transport layer, thereby preparing a photoelectric sensor of 10 μm in thickness.

EXAMPLE 4

By vapor evaporation, a gold electrode was formed over an area of 4 mm×4 mm on the carrier transport layer of each of the photoelectric sensors prepared in Examples 1–3. In a dark place, a voltage of 100 V was applied across the transparent and gold electrodes while the transparent electrode was kept positive. The current value was then measured 500 msec after the application of voltage. The respective current values were $8.0 \times 10^{-7}$ A/cm$^2$, $2.4 \times 10^{-8}$ A/cm$^2$, and $3.6 \times 10^{-5}$ A/cm$^2$.

EXAMPLE 5

Five (5) parts of polyvinyl alcohol were dissolved in 95 parts of pure water to prepare a coating solution, which was in turn spin-coated on each of the carrier transport layers of the photoelectric sensors prepared in Examples 1–3, and then vacuum-dried at 80° C. for 2 hours to form an interlayer of 1.5 μm in thickness.

EXAMPLE 6

A liquid crystal recording layer of 6 μm in thickness was stacked on each of the interlayers of the photoelectric sensors prepared in Examples 1–3 and 5. The liquid crystal recording layer was prepared as follows.

A mixture consisting of 4 parts of dipentaerythritol hexaacrylate, smectic liquid crystals ("S6" made by Merck), 0.2 parts of a fluorine surfactant ("Florado FC-430" made by 3M), and 0.2 parts of a photopolymerization initiator ("Dalocure 1173" made by Merck) was controlled to a solid content of 30% with the use of xylene. The resulting solution was coated on the side of a glass substrate on which an ITO transparent electrode (of 500 Å in thickness and 80 Ω/☐ in resistance) was formed, using a blade coater having a gap thickness of 50 μm, retained at 50° C., and irradiated with UV light at 0.3 J/cm$^2$ to prepare a liquid crystal recording layer of about 6 μm in thickness. Using hot methanol, liquid crystals were extracted from a section of this liquid crystal recording layer, dried, and internally observed under a scanning electron microscope of 10,000 magnifications ("S-800" made by Hitachi, Ltd.). As a result, it was found that the layer is covered thereon with an UV cured type resin of 0.6 μm in thickness and filled therein with resin particles of 0.1 μm in diameter.

After the liquid crystal recording layer had been formed in this way, an ITO electrode of about 1,000 Å in thickness was formed thereon by sputtering.

EXAMPLE 7

An integrated type of information recording system constructed using the photoelectric sensor obtained in Example 1 was irradiated with image carrying light from the transparent side of the photoelectric sensor for 33 msec, while a voltage of 420 V was applied across both electrodes for 80 msec, with the photoelectric sensor kept positive. After the application of voltage, the information recording system was irradiated with blue light to read the transmitted light by means of a CCD sensor. As a result, an image signal of high contrast was obtained.

EXAMPLE 8

An integrated type of information recording system constructed using the photoelectric sensor obtained in Example 2 was irradiated with image carrying light from the transparent side of the photoelectric sensor for 33 msec, while a voltage of 420 V was applied across both electrodes for 80 msec, with the photoelectric sensor kept positive. After the application of voltage, the information recording system was observed, but no change was found.

EXAMPLE 9

An integrated type of information recording system constructed using the photoelectric sensor obtained in Example 2 was irradiated with image carrying light from the transparent side of the photoelectric sensor for 33 msec, while a voltage of 850 V was applied across both electrodes for 80 msec, with the photoelectric sensor kept positive. After the application of voltage, the information recording system was observed. As a result, it was found that the liquid crystal recording layer was overall oriented regardless of the image exposed to light.

EXAMPLE 10

An integrated type of information recording system constructed using the photoelectric sensor obtained in Example 3 was irradiated with image carrying light from the transparent side of the photoelectric sensor for 33 msec, while a voltage of 320 V was applied across both electrodes for 50 msec, with the photoelectric sensor kept positive. After the application of voltage, the information recording system was irradiated with blue light to read the transmitted light by means of a CCD sensor. As a result, the obtained image signal was found to be of low contrast.

The present invention as above explained provides an integrated type of information recording system including a dielectric interlayer, which enables the optimum photoelectric sensor to be specified even when there are changes in the capacity and resistance of the dielectric interlayer and the capacity, resistance and threshold voltage of the liquid crystal recording layer, and enables information to be recorded at the optimum applied voltage for the optimum voltage applying time.

What we claim is:

1. An information recording method using an integrated type of information recording system having a photoconductive layer, a dielectric interlayer, a liquid crystal recording layer and an electrode layer stacked on a transparent electrode in the described order, wherein the photoconductive layer is exposed to information light with voltage applied across both electrodes of the system so that the liquid crystals are oriented to record image information depending on the quantity of the exposure light, characterized in that:

from the following equations:

$$V_S(0) = \frac{C_M C_L}{C_S C_M + C_M C_L + C_L C_S} V_{AP}$$

$$V_M(0) = \frac{C_L C_S}{C_S C_M + C_M C_L + C_L C_S} V_{AP}$$

$$V_L(0) = \frac{C_S C_M}{C_S C_M + C_M C_L + C_L C_S} V_{AP}$$

$$I_S + C_S(dVS/dt) = I_M + C_M(dV_M/dt)$$
$$= I_L + C_L(dV_L/dt)$$

$$V_S + V_M + V_L = V_{AP}$$

$$dV_M/dt = \frac{C_L I_S - (C_S + C_L)I_M + C_S I_L}{C_S C_M + C_M C_L + C_L C_S}$$

$$dV_L/dt = \frac{C_M I_S + C_S I_M - (C_S + C_M)I_L}{C_S C_M + C_M C_L + C_L C_S}$$

$$V_M(t + \Delta t) = V_M(t) + (dV_M/dt)\Delta t$$
$$V_L(t + \Delta t) = V_L(t) + (dV_L/dt)\Delta t$$

where $V_{AP}$ is the voltage applied across both electrodes; $C_S$, $C_L$ and $C_M$ are the capacities of the photoconductive layer, the liquid crystal recording layer and the interlayer, respectively; $V_S$, $V_L$ and $V_M$ are the voltages applied on the respective layers; $I_S$, $I_L$ and $I_M$ are the currents flowing through the respective layers; and $V_S(0)$, $V_M(0)$ and $V_L(0)$ are the voltages applied on the respective layers just after the application of voltages, changes-with-time in the voltages of exposed and unexposed portions of the liquid crystal recording layer with respect to the photoconductive layer having a varying dark current value are found by varying the applied voltage, and the applied voltage and the value of the dark current through the photoconductive layer are determined such that when the voltage of the unexposed portion of the liquid crystal recording layer reaches the threshold voltage of the liquid crystal recording layer, the difference in voltage between the exposed and unexposed portions of the liquid crystal recording layer reaches a maximum, so that information is recorded with the photoconductive layer and at the applied voltage, where a potential difference is obtained, which is at least one half of the difference maximum contrast in the voltages applied on the liquid crystals at the exposed and unexposed portions of the liquid crystal recording layer.

2. The method as recited in claim 1, characterized by use of a photoconductive layer whose dark current value is such that upon the application of a voltage at which the difference in voltage between the exposed and unexposed portion of the liquid crystal recording layer reaches a maximum, the voltage applied on the liquid crystal recording layer depending upon the capacity ratio of the liquid crystal recording layer, photoconductive layer and dielectric interlayer is lower than the threshold voltage of said liquid crystal recording layer just after the application of the voltage.

3. The method as recited in claim 1, characterized by use of a photoconductive layer whose dark current value is such that upon the application of a voltage at which the difference in voltage between the exposed and unexposed portion of the liquid crystal recording layer reaches a maximum, the voltage applied on the liquid crystal recording layer depending upon the capacity ratio of the liquid crystal recording layer, photoconductive layer and dielectric interlayer is at most one half of the threshold voltage of said liquid crystal recording layer just after the application of the voltage.

4. The method as recited in claim 1, characterized by use of a photoconductive layer whose dark current value is such that upon the application of a voltage at which the difference in voltage between the exposed and unexposed portion of the liquid crystal recording layer reaches a maximum, the time taken for the voltage applied on the liquid crystal recording layer at the unexposed portion to reach the threshold voltage is up to 200 msec.

5. The method as recited in claim 1, characterized by use of a photoconductive layer whose dark current value is such that upon the application of a voltage at which the difference in voltage between the exposed and unexposed portion of the liquid crystal recording layer reaches a maximum, the time taken for the voltage applied on the liquid crystal recording layer at the unexposed portion to reach the threshold voltage is up to 100 msec.

6. The method as recited in claim 2, characterized by use of a photoconductive layer whose dark current value is such that upon the application of a voltage at which the difference in voltage between the exposed and unexposed portion of the liquid crystal recording layer reaches a maximum, the time taken for the voltage applied on the liquid crystal recording layer at the unexposed portion to reach the threshold voltage is up to 200 msec.

7. The method as recited in claim 2, characterized by use of a photoconductive layer whose dark current value is such that upon the application of a voltage at which the difference in voltage between the exposed and unexposed portion of the liquid crystal recording layer reaches a maximum, the time taken for the voltage applied on the liquid crystal recording layer at the unexposed portion to reach the threshold voltage is up to 100 msec.

* * * * *